United States Patent [19]
Nagahori

[11] Patent Number: 5,838,731
[45] Date of Patent: Nov. 17, 1998

[54] BURST-MODE DIGITAL RECEIVER

[75] Inventor: Takeshi Nagahori, Tokyo, Japan

[73] Assignee: NEC Corporation, Tokyo, Japan

[21] Appl. No.: 565,098

[22] Filed: Nov. 30, 1995

[30] Foreign Application Priority Data

Dec. 1, 1994 [JP] Japan ................................. 6-298110

[51] Int. Cl.$^6$ ............................................. H04L 25/34
[52] U.S. Cl. ......................... 375/289; 375/340; 375/215; 329/361
[58] Field of Search .................... 375/289, 328, 375/340, 351, 222, 318; 329/309, 310, 361; 327/76

[56] References Cited

U.S. PATENT DOCUMENTS

| | | | |
|---|---|---|---|
| 3,894,288 | 7/1975 | Musser, Jr. ................................ | 327/76 |
| 4,524,462 | 6/1985 | Cottatelucci ............................. | 375/289 |
| 4,581,731 | 4/1986 | Tomikashi et al. ....................... | 370/4 |
| 4,714,828 | 12/1987 | Bacou et al. ............................. | 250/214 |
| 4,754,273 | 6/1988 | Okada et al. ............................ | 375/222 |
| 5,025,456 | 6/1991 | Ota et al. ................................. | 375/76 |
| 5,371,763 | 12/1994 | Ota et al. ................................. | 375/318 |
| 5,381,052 | 1/1995 | Kolte ....................................... | 327/76 |

FOREIGN PATENT DOCUMENTS

| | | |
|---|---|---|
| 57009154 | 1/1982 | European Pat. Off. . |
| 0347359 | 12/1989 | European Pat. Off. . |
| 0597632 | 5/1994 | European Pat. Off. . |

OTHER PUBLICATIONS

Japanese Institution of Electronics Information and Communication; Meeting of Spring, 1993 (B–987); "Development of Optical Receiver Circuit for Passive Double Star".

C.A. Brackett et al.; "A Noise Immune 32Mb/s Optical Data Link"; Sixth European Conference On Optical Communication, University of York, United Kingdom; Sep. 16–19–1980; pp. 458–461.

Primary Examiner—Jason Chan
Assistant Examiner—Congvan Tran
Attorney, Agent, or Firm—Sughrue, Mion, Zinn, Macpeak & Seas, PLLC

[57] ABSTRACT

A burst-mode digital receiver which minimizes any reduction in the minimum input level as compared with a continuous-signal digital receiver includes a unipolar code-to-bipolar code converter for converging unipolar code pulses of an inputted burst signal into bipolar code pulses, an identifying circuit for identifying logic levels of "1" and "0" with an identifying level at a center of a pulse duration of bipolar code pulses outputted from the unipolar code-to-bipolar code converter, and a burst on/off detecting circuit for continuously outputting a signal until the inputted burst signal is finished when a pulse amplitude of the inputted burst signal exceeds a constant value. The burst-mode digital receiver produces an output signal when an AND gate connected to the output terminal of the identifying circuit is turned on at the time the output signal from the burst on/off detecting circuit is turned on.

6 Claims, 8 Drawing Sheets

BURST-MODE DIGITAL RECEIVER

BACKGROUND OF THE INVENTION

1. Field of the Invention

The present invention relates to a receiver for use in a burst transmission system such as a passive optical network (PON) or the like.

2. Description of the Prior Art

There has been devised a PON system in which one transmission path extending from a station is branched to provide service to a plurality of subscribers in order to establish an economical optical subscriber data transmission system. In the PON system, a signal received by the station comprises a burst signal whose signal intensity changes abruptly because signals transmitted from subscribers to the station are multiplexed by time-division multiplex access (TDMA).

If an input signal is a digital binary signal produced by modulating an analog signal with digital binary modulation, then an output signal from the receiver in the station can be of either one of three values, i.e., "1" corresponding to a mark, "0" corresponding to a space, and "undefined" corresponding to a non-signal region between bursts. When no signal is inputted, however, it is desirable for the receiver to keep outputting a constant logic level of "1" or "0" in order to simplify a synchronizing circuit and TDMA control circuit that are connected to the output terminal of the receiver.

Figure 1:
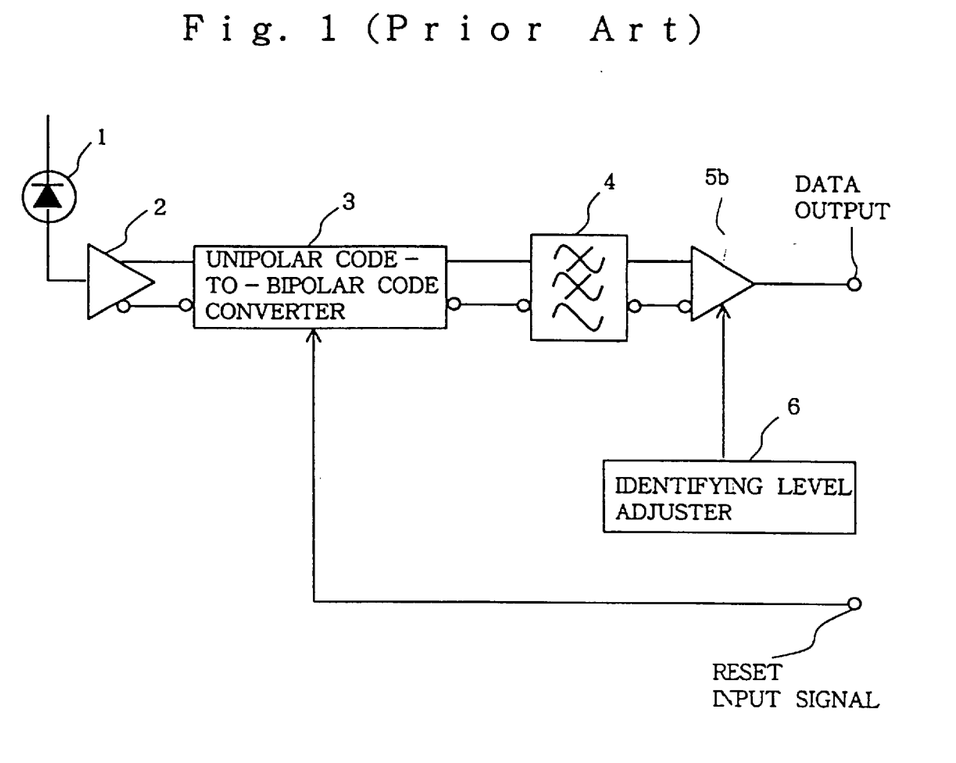
FIG. 1 is a block diagram of a conventional burst-mode optical receiver.
Figure 2:
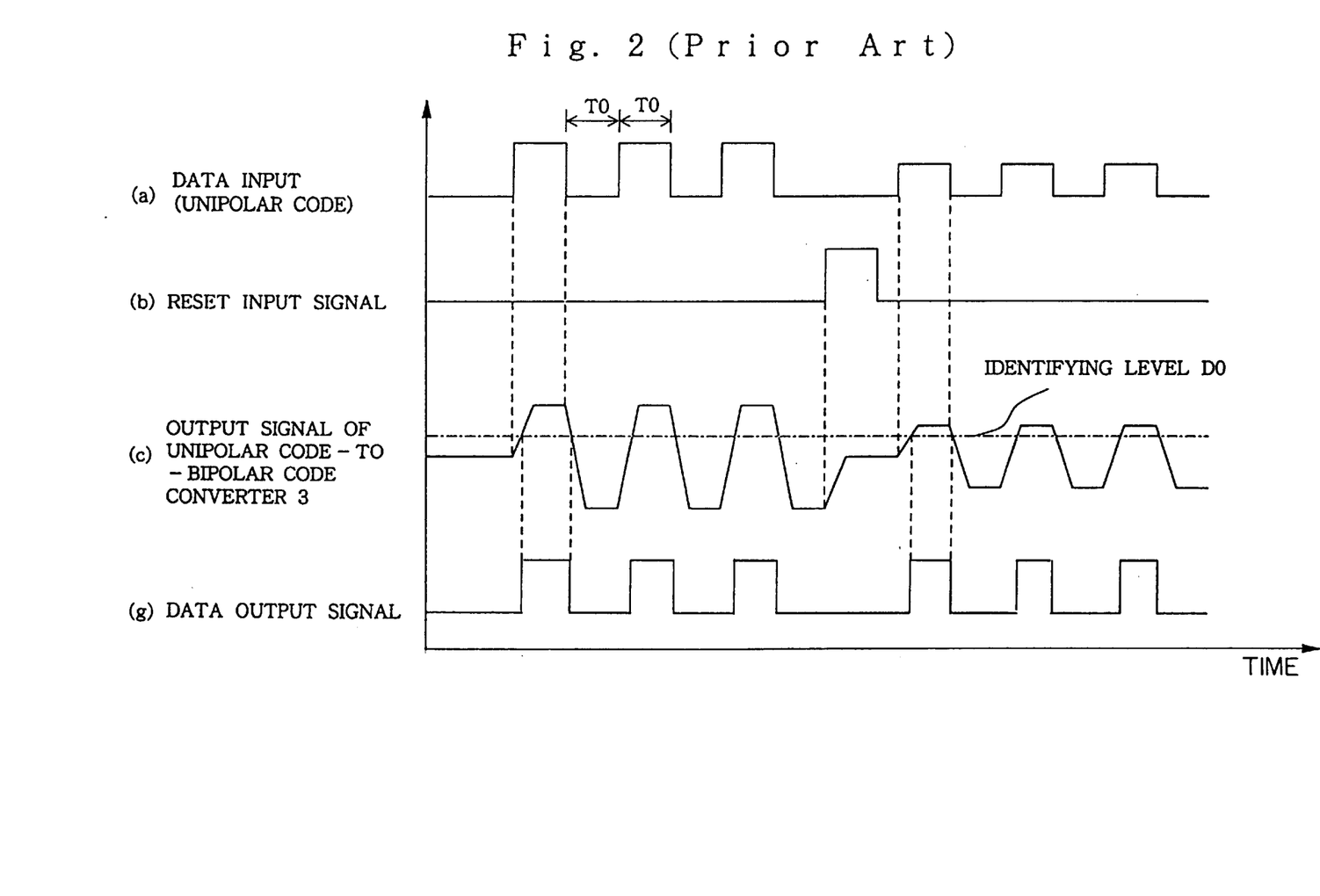
FIG. 2 is a diagram showing the waveforms of signals which are illustrative of operation of the conventional burst-mode optical receiver.

FIGS. 1 and 2 of the accompanying drawings show a conventional burst-mode optical receiver. In order for the conventional burst-mode optical receiver to keep outputting a logic level of "0" when no signal is inputted, a certain offset level is imparted to the input section of an identifying circuit to determine whether an input signal pulse is of a logic level of "1" or "0" at a position that deviates by a certain value from the center of the amplitude of the input signal pulse. Such conventional burst-mode optical receiver is disclosed in U.S. Pat. No. 5,025,456 or B-987, Spring National Convention of Electronic Information Communication Society, 1993. According to the latter document, one station device and a plurality of subscriber devices are connected by optical couplers, making up an optical reception circuit including a high-speed AGC circuit to establish an inexpensive optical transmission network.

For identifying a logic level of "1" or "0" with respect to an input signal pulse that has been modulated by digital binary modulation in a system where the signal-to-noise ratio (the ratio of signal power to noise power) is determined only by the noise in a reception circuit such as an optical reception circuit using a PIN diode, it is preferable to identify the logic level at the center of the amplitude of the input signal pulse in order to maximize the signal-to-noise ratio and also equalize the duration of an output pulse from the identifying circuit to a clock period TO for maximizing the margin for the identifying position.

In the conventional burst-mode optical receiver, however, since a certain offset level is imparted to the input section of an identifying circuit to identify the logic level at a position higher than the center of the pulse amplitude, and the offset level has a large effect especially when the input pulse amplitude is small. Specifically, as shown in FIG. 2, when the input pulse amplitude is small, the logic level is identified at a position deviation from the maximum signal-to-noise ratio, and the duration of output pulses is reduced, failing to provide an identifying phase margin sufficient to operate a bit synchronizing circuit connected to the output terminal of the receiver. The latter problem can be solved by setting the reception system to a wider frequency range. The reception range of a receiver for receiving a continuous signal having a clock frequency of fc is usually set to 0.7 fc, whereas the conventional burst-mode optical receiver is set to 1.0 fc~1.5 fc. However, the wider frequency range results in a poor signal-to-noise ratio because the noise range of the receiver is also increased. Due to the poor signal-to-noise ratio and the reduced identifying phase margin, the conventional burst-mode optical receiver has been problematic in that the minimum level of light detection is 3 dB through 5 dB lower than the continuous signal receiver where the identifying level is established at the center of the signal amplitude at all times.

SUMMARY OF THE INVENTION

It is therefore an object of the present invention to provide a burst-mode digital receiver which minimizes any reduction in the minimum input level as compared with a continuous-signal digital receiver.

According to the present invention, there is provided a burst-mode digital receiver comprising a unipolar code-to-bipolar code converter for converging unipolar code pulses of an inputted burst signal into bipolar code pulses, an identifying circuit for identifying logic levels of "1" and "0" with an identifying level at a center of a pulse duration of bipolar code pulses outputted from the unipolar code-to-bipolar code converter, sa burst on/off detecting circuit for continuously outputting a signal until the inputted burst signal is finished when a pulse amplitude of the inputted burst signal exceeds a constant value, and a gate for selectively turning on and off an output signal from the identifying circuit depending o n the signal out putted from the burst on/off detecting circuit.

The burst on off detecting circuit may comprise a level detector for outputting a signal pulse when an input signal applied thereto reaches a predetermined value, and a set-reset flip-flop which can be set by the signal pulse outputted from the level detector and reset by a reset signal supplied from a source external to the burst-mode digital receiver.

Alternatively, the burst on/off detecting circuit may comprise means for continuously outputting a signal until the inputted burst signal is finished when the pulse amplitude of bipolar code pulses outputted from the unipolar code-to-bipolar code converter exceeds a constant value.

In a conventional burst-mode optical signal receiver, an offset a is given to an identifying level so that the receiver outputs a logic level of "0" when no signal is inputted. According to the present invention, the identifying level of the identifying circuit is set to the center of the signal amplitude at all times. When no signal is inputted, the identifying circuit produces an undefined output signal. However, since the set-reset flip-flop produces an output signal of "0", the receiver produces an output sign al of "0" which is obtained through the gate.

When a burst optical signal is inputted, the level detector produces an output signal of "1" and the set-reset flip-flop produces an output signal of "1", so that the output signal from the identifying circuit is outputted as it is through the AND gate. When the burst optical signal is finished, since the reset signal is applied to the set-reset flip-flop, the set-reset flip-flop continuously produces an output signal "0" until a next burst optical signal is inputted. Consequently, the receiver continuously produces an output signal of "0" which is obtained through the AND gate.

Inasmuch as the identifying level of the identifying circuit is set to the center of the signal amplitude at all times, the signal-to-noise ratio and the identifying phase margin of the burst-mode digital receiver are similar to those of the continuous signal digital receiver, and the reception sensitivity of the burst-mode digital receiver is improved.

DETAILED DESCRIPTION OF THE PREFERRED EMBODIMENTS

Figure 3:
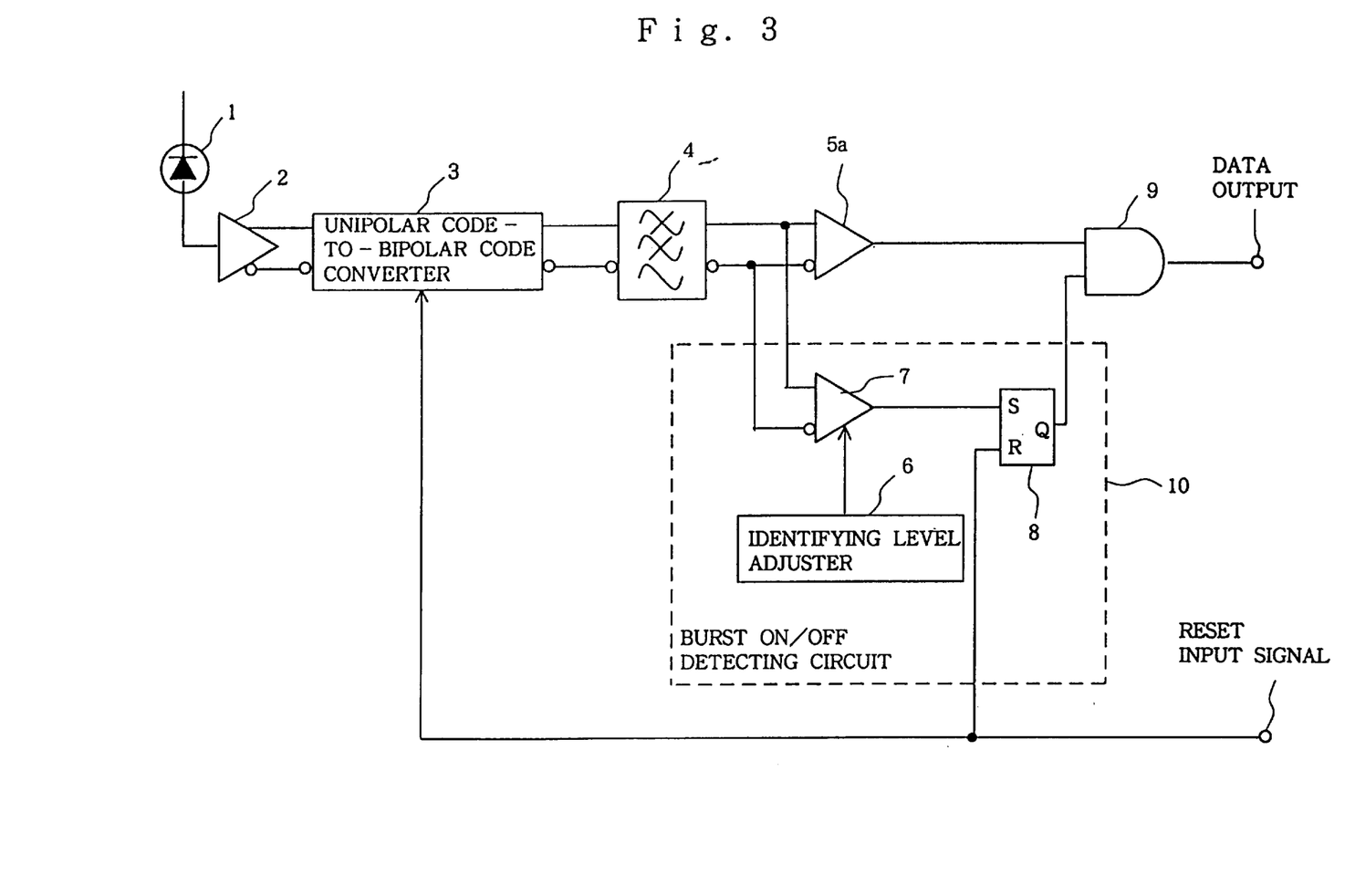
FIG. 3 is a block diagram of a burst-mode digital receiver according to the present invention.
Figure 4:
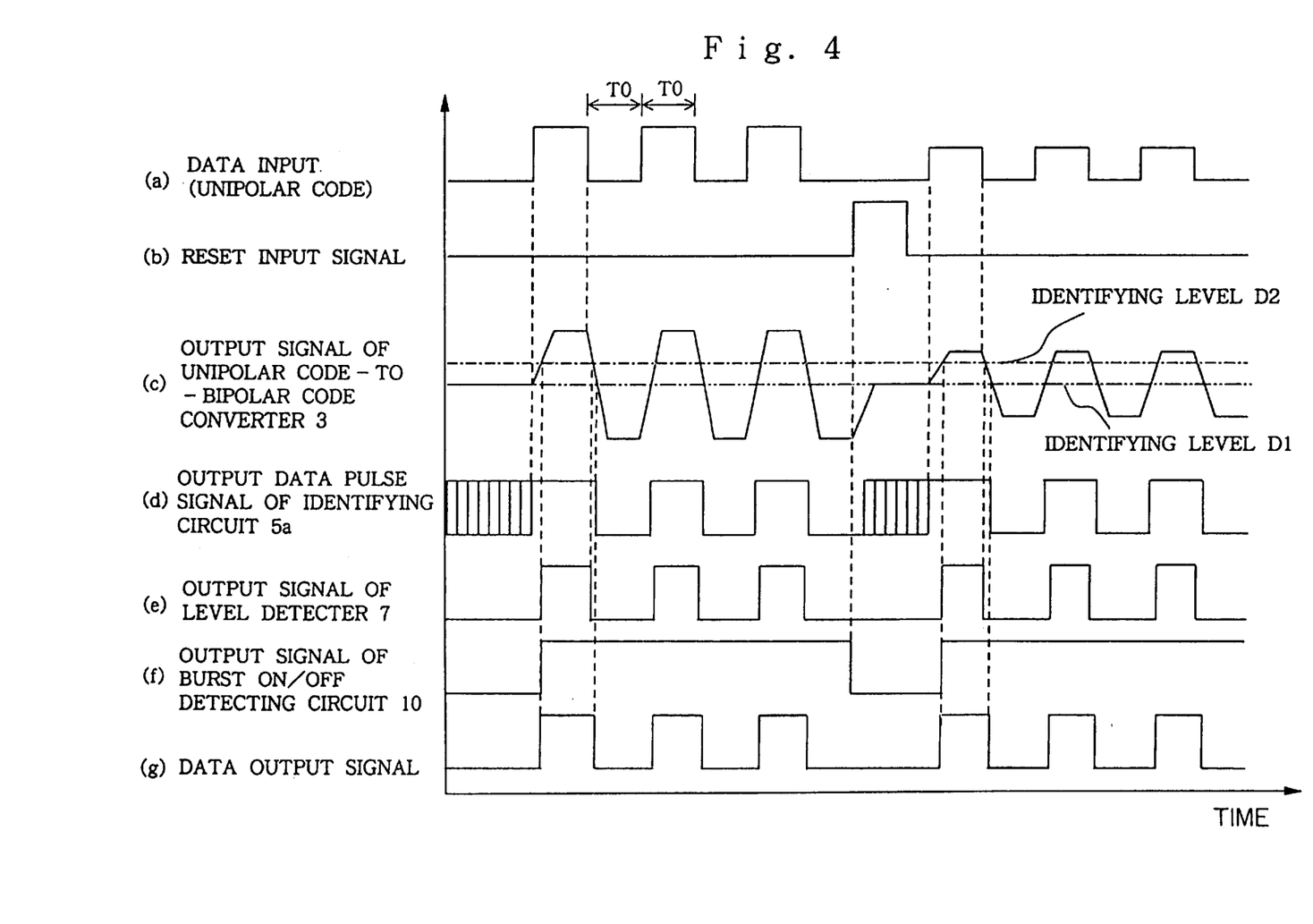
FIG. 4 is a diagram showing the waveforms of signals which are illustrative of operation of the burst-mode digital receiver according to the present invention.

FIG. 3 shows in block form a burst-mode digital receiver according to the present invention, and FIG. 4 shows the waveforms of signals which are illustrative of operation of the burst-mode digital receiver according to the present invention.

As shown in FIGS. 3 and 4, a unipolar-code data signal pulse train (data input (a)) detected as a photo current by a light detector 1 is supplied through a preamplifier 2 to a unipolar code-to-bipolar code converter 3, by which the unipolar-code data signal pulse train is converted into a bipolar-code data signal pulse train (output signal (c) of the unipolar code-to-bipolar code converter 3).

The bipolar-code data signal pulse train is supplied through a rolloff low-pass filter 4 to an identifying circuit 5a which comprises a limiter amplifier and also to a burst on/off detecting circuit 10. The burst on/off detecting circuit 10 comprises a level detector 7 comprising a limiter amplifier, an identifying level adjuster 6 for adjusting the detection level of the level detector 7, and a set-reset flip-flop 8. The set-reset flip-flop 8 is set by an output signal from the level detector 7, and reset by a reset input signal (b) which is supplied from a source, external to the burst-mode digital receiver, between bursts.

The identifying circuit 5a has an identifying level D1 set at the center of the pulse amplitude of the bipolar-code data signal pulse train that is outputted from the unipolar code-to-bipolar code converter 3. Therefore, the identifying circuit 5a produces an output data pulse signal (d) which is undefined when no signal is inputted, and has a period that is substantially the same as the clock period T0 of the data input (a) except an initial portion of a burst of data when it is inputted.

The level detector 7 produces an output signal (e) which is the same as the output signal of the conventional burst-mode digital receiver.

The burst on/off detecting circuit 10 produces an output signal (f) which keeps an ON state from the first bit of the burst until a reset pulse is supplied, because of operation of the set-reset flip-flop 8.

The output data pulse signal (d) from the identifying circuit 5a and the output signal (f) from the burst on/off detecting circuit 10 are ANDed by an AND gate 9, which produces a logic level of "0" when no signal is inputted and a data output signal (g) when a burst is inputted, the data output signal (g) being identified at the maximum signal-to-noise ratio and having a pulse duration substantially the same as the clock period T0 of the data input (a).

As described above, the data output signal (g) is produced when the output data pulse signal (d) from the identifying circuit 5a and the output signal (f) from the burst on/off detecting circuit 10 are ANDed by the AND gate 9. The output signal (f) from the burst on/off detecting circuit 10 is produced from the output signal (c) of the unipolar code-to-bipolar code converter 3 based on an identifying level D2. Therefore, depending on the setting of the identifying level D2, the level detector 7 may not produce its output signal (e) when the detected level of the data input (a) is too low. When this happens, the data output signal (g) is of a "0" level. According to the present invention, therefore, it is necessary to set the identifying level D2 to a value that can detect the minimum detected level of the data input (a).

When the identifying level D2 is set to a sufficiently low value that can detect the minimum detected level of the data input (a), a reduction in the pulse duration of the data output (g) at low detected levels of the data input (a) can be suppressed.

Since the pulse duration of the output data is prevented from being reduced in the vicinity of the minimum detected level of the data input, as described above, the burst-mode digital receiver according to the present invention has an increased identifying phase margin for the received data output. Furthermore, any reduction of the sensitivity of the burst-mode digital receiver, which is constructed as a 3R receiver that includes a bit synchronizing circuit compatible with bursts and requires a large identifying phase margin, as compared with a receiver for receiving a continuous signal of minimum detected level is smaller than the conventional burst-mode digital receiver.

Since the reception frequency range of the burst-mode digital receiver according to the present invention can be reduced to around 0.7 fc which is of a general value in the continuous signal receiver, the signal-to-noise ratio of the burst-mode digital receiver according to the present invention is better than the conventional burst-mode digital receiver. The identifying level D2 of the level detector 7 which determines the minimum input level of the burst-mode digital receiver according to the present invention can be set to a value lower than the identifying level of the identifying circuit Sb shown in FIG. 1, i.e., the identifying level DO shown at (c) in FIG. 2. Consequently, any reduction of the sensitivity of the burst-mode digital receiver, which is constructed even as a 2R receiver, as compared with a receiver for receiving a continuous signal of minimum detected level is smaller than the conventional burst-mode digital receiver.

Inasmuch as the logic level is identified at the center of the pulse amplitude at all times, as described above, the logic level is identified at the maximum signal-to-noise ratio and the maximum identifying phase margin, and any reduction of the sensitivity of the minimum input level as compared with the continuous signal receiver is reduced.

For example, whereas the minimum input level of the conventional burst-mode digital receiver is 3 dB through 5 dB lower than that of a continuous signal receiver composed of an equivalent device for an equivalent transmission rate, the minimum input level of the burst-mode digital receiver according to the present invention is 1 dB through 2 dB lower than that of the continuous signal receiver. The minimum input level is determined by the detection level of the burst on/off detecting circuit.

Various unipolar code-to-bipolar code converters according to the present invention will be described below with reference to FIGS. 5 through 8.

Figure 5:
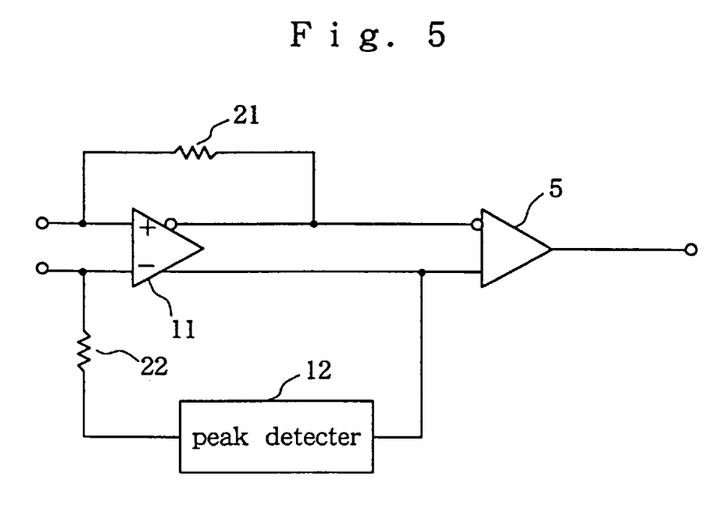
FIG. 5 is a block diagram of a unipolar code-to-bipolar code converter according to a first embodiment of the present invention.

FIG. 5 shows in block form a unipolar code-to-bipolar code converter according to a first embodiment of the present invention. The unipolar code-to-bipolar code converter according to the first embodiment comprises a trans impedance amplifier in the form of a differential amplifier 11 which feeds back an inverted output signal through a resistor 21 to a normal input terminal and a normal output signal through a peak detector 12 and a-resistor 22 to an inverting input terminal. The trans impedance amplifier is disclosed in U.S. Pat. No. 5,025,456. Using the transimpedance amplifier, it is possible to obtain a bipolar code from the second bit of a burst signal.

Figure 6:
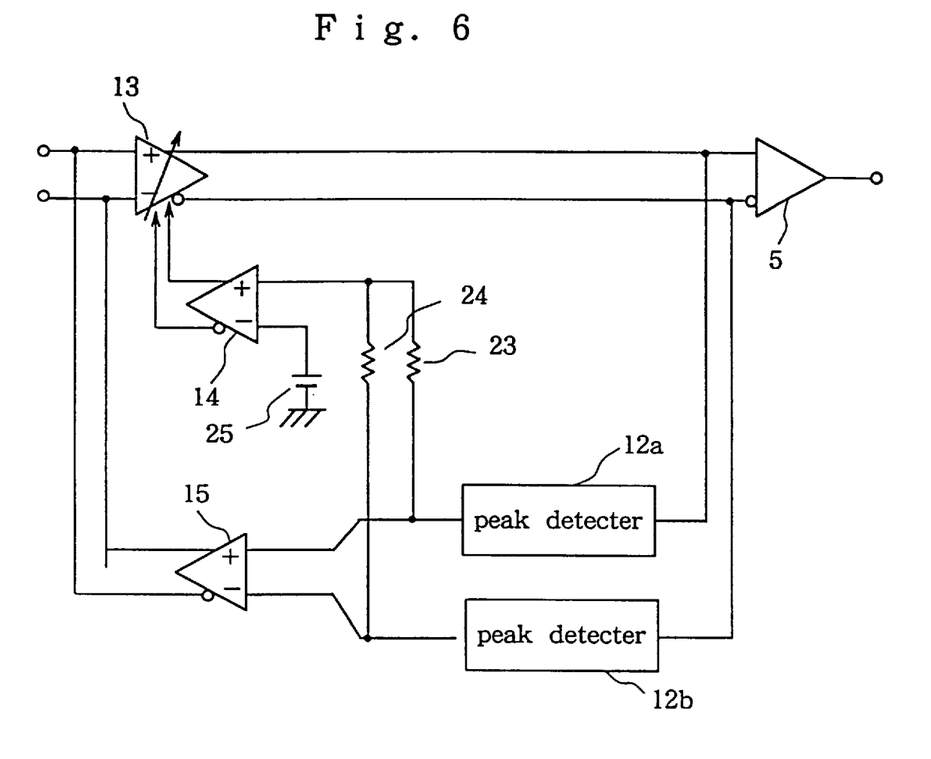
FIG. 6 is a block diagram of a unipolar code-to-bipolar code converter according to a second embodiment of the present invention.

FIG. 6 shows in block form a unipolar code-to-bipolar code converter according to a second embodiment of the present invention. The unipolar code-to-bipolar code converter according to the second embodiment comprises a variable-gain differential amplifier 13 for performing gain control and offset control, which is widely used in receivers in optically coupled transmission systems or optical data links. As shown in FIG. 6, the peak value of a normal input signal applied to a differential AGC amplifier 15 is detected by a peak detector 12a, and the peak value of an inverting input signal applied to the differential AGC amplifier 15 is detected by a peak detector 12b. The gain of the variable-gain differential amplifier 13 is controlled by equalizing output voltages of the peak detectors 12a, 12b for thereby equalizing the average value of the output voltages of the peak detectors 12a, 12b to a reference voltage 25.

Figure 7:
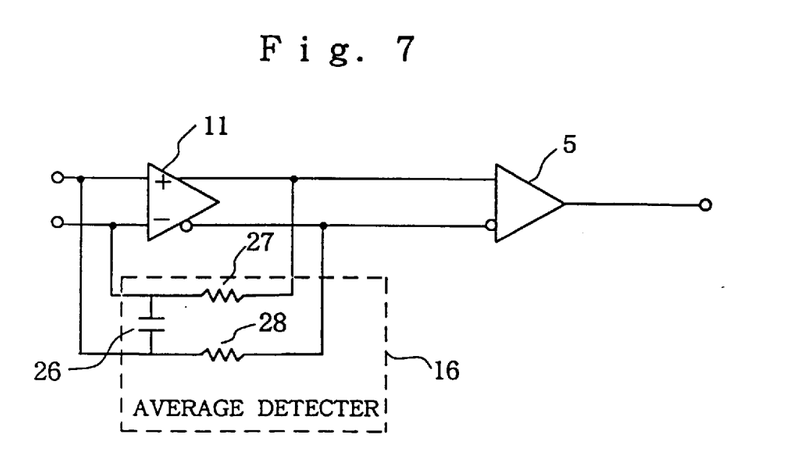
FIG. 7 is a block diagram of a unipolar code-to-bipolar code converter according to a third embodiment of the present invention.

FIG. 7 shows in block form a unipolar code-to-bipolar code converter according to a third embodiment of the present invention. The unipolar code-to-bipolar code converter according to the third embodiment includes an offset canceler for making constant a time average of normal and inverted output signals of a differential amplifier 11. An average detector 16 comprises a pair of resistors 27, 28 and a capacitor 26. The unipolar code-to-bipolar code converter according to the third embodiment is advantageous in that a large dynamic range can be obtained by a simple arrangement.

Figure 8:
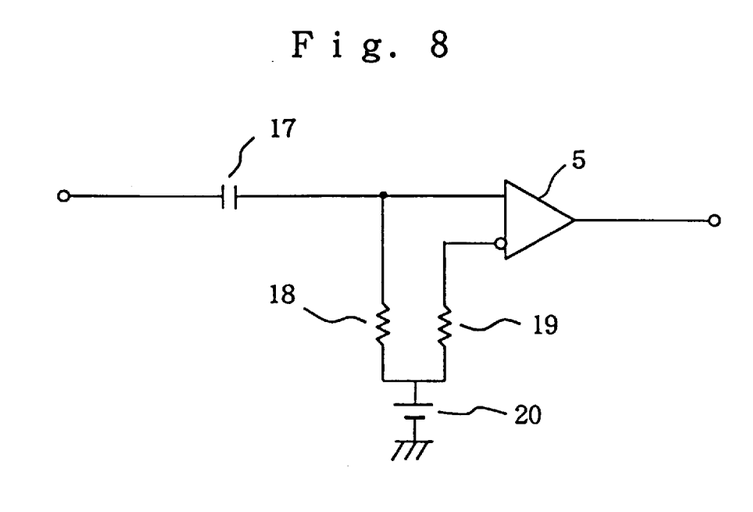
FIG. 8 is a block diagram of a unipolar code-to-bipolar code converter according to a fourth embodiment of the present invention.

FIG. 8 shows in block form a unipolar code-to-bipolar code converter according to a fourth embodiment of the present invention. The unipolar code-to-bipolar code converter according to the fourth embodiment includes a capacitor 17 coupling amplifiers.

In the burst-mode digital receiver according to the present invention, an output signal from the unipolar code-to-bipolar code converter 3 is applied through the low-pass filter 4 as an input signal to the burst on/off detecting circuit 10. However, an output signal from another element in the receiver, e.g., an output signal from the preamplifier 2, may be applied as an input signal to the burst on/off detecting circuit 10. The set-reset flip-flop 8 of the burst on/off detecting circuit 10 may be replaced with a peak detector or a monostable multivibrator. Depending on a given guard time between bursts, the burst on/off detecting circuit 10 may be arranged without a reset signal.

The reset signal used in the burst-mode digital receiver according to the present invention may be a reset signal which is generally supplied to reset a unipolar code-to-bipolar code converter in an optical receiver of the type described above.

With the arrangement of the present invention, as described above, the burst on/off detecting circuit is employed, and when no signal is inputted, the output signal from the set-reset flip-flop in the burst on/off detecting circuit is set to "0" to turn off the AND gate for identifying the logic level at the center of the pulse amplitude at all times. Therefore, the logic level is identified at the maximum signal-to-noise ratio and the maximum identifying phase margin. The burst-mode digital receiver according to the present invention suffers no substantial reduction in the minimum input level as compared with the continuous signal digital receiver. Specifically, whereas the minimum input level of the conventional burst-mode digital receiver is 3 dB through 5 dB lower than that of a continuous signal receiver composed of an equivalent device for an equivalent transmission rate, the minimum input level of the burst-mode digital receiver according to the present invention is 1 dB through 2 dB lower than that of the continuous signal receiver. Since the AND gate is turned off when no signal is inputted, no adverse effects are imposed on a synchronizing circuit and an access control circuit which are connected to the output terminal of the burst-mode digital receiver.

What is claimed is:

1. A burst-mode digital receiver comprising:
    a unipolar code-to-bipolar code converter for converting unipolar code pulses of an inputted burst signal into bipolar code pulses;
    an identifying circuit for identifying logic levels of "1" and "0" with an identifying level set at a center of a pulse amplitude of the bipolar code pulses outputted from said unipolar code-to-bipolar code converter;
    a burst on/off detecting circuit that continuously outputs a signal until the inputted burst signal is finished, after a pulse amplitude of the inputted burst signal exceeds a constant value; and
    a gate for selectively turning on and off an output signal from said identifying circuit depending on the signal outputted from said burst on/off detecting circuit.

2. A burst-mode digital receiver according to claim 1, wherein said burst-mode on/off detecting circuit comprises means for continuously outputting a signal until the inputted burst signal is finished, after a pulse amplitude of the bipolar code pulses outputted from said unipolar code-to-bipolar code converter exceeds a constant value.

3. A burst-mode digital receiver comprising:
    a unipolar code-to-bipolar code converter for converting unipolar code pulses of an inputted burst signal into bipolar code pulses;
    an identifying circuit for identifying logic levels of "1" and "0" with an identifying level set at a center of a pulse amplitude of the bipolar code pulses outputted from said unipolar code-to-bipolar code converter;
    a burst on/off detecting circuit that continuously outputs a signal with a logic level of "1" until the inputted burst signal is finished, after a pulse amplitude of the inputted burst signal exceeds a constant value; and a gate for selectively turning on and off an output signal from said identifying circuit depending on the signal outputted from said burst on/off detecting circuit.

4. A burst-mode digital receiver according to claim 3, wherein said burst on/off detecting circuit comprises a level detector for outputting a signal pulse when an input signal applied thereto reaches a predetermined value, and a set-reset flip-flop which can be set by the signal pulse outputted from said level detector and by a reset signal supplied from a source external to the burst-mode digital receiver.

5. A burst-mode digital receiver according to claim 3, wherein said burst-mode on/off detecting circuit comprises means for continuously outputting a signal with a logic level of "1" until the inputted burst signal is finished, after a pulse amplitude of the bipolar code pulses outputted from said unipolar code-to-bipolar code converter exceeds a constant value.

6. A burst-mode digital receiver comprising:

a unipolar code-to-bipolar code converter for converting unipolar code pulses of an inputted burst signal into bipolar code pulses;

an identifying circuit for identifying logic levels of "1" and "0" with an identifying level set at a center of a pulse amplitude of the bipolar code pulses outputted from said unipolar code-to-bipolar code converter;

a burst on/off detecting circuit that continuously outputs a signal until the inputted burst signal is finished, after a pulse amplitude of the inputted burst signal exceeds a constant value; and a gate for selectively turning on and off an output signal from said identifying circuit depending on the signal outputted from said burst on/off detecting circuit;

wherein said burst on/off detecting circuit comprises a level detector for outputting a signal pulse when an input signal applied thereto reaches a predetermined value, and a set-reset flip-flop which can be set by the signal pulse outputted from said level detector and by a reset signal supplied from a source external to the burst-mode digital receiver.

* * * * *